(12) United States Patent
Carman

(10) Patent No.: US 6,378,215 B1
(45) Date of Patent: Apr. 30, 2002

(54) DEVICE FOR SEVERING ELECTRICAL CONDUCTORS

(76) Inventor: John B. Carman, 2904 S. Oliver Rd., Newton, KS (US) 67114

( * ) Notice: Subject to any disclaimer, the term of this patent is extended or adjusted under 35 U.S.C. 154(b) by 0 days.

(21) Appl. No.: 09/792,587

(22) Filed: Feb. 26, 2001

(51) Int. Cl.$^7$ .......................... B26B 13/00; B26B 13/28
(52) U.S. Cl. ............................................ 30/192; 30/350
(58) Field of Search .................... 30/192, 252, 254, 30/350, 190, 193

(56) References Cited

U.S. PATENT DOCUMENTS

| | | |
|---|---|---|
| 2,910,900 A | 11/1959 | Klein |
| 3,074,164 A | 1/1963 | Porter |
| 4,121,338 A | 10/1978 | Siden et al. |
| 4,250,620 A | 2/1981 | Nishikawa |
| 4,715,122 A | 12/1987 | Lindem |
| 4,910,870 A | 3/1990 | Chang |
| 4,932,291 A | 6/1990 | Potesta |
| 4,995,128 A | 2/1991 | Montgomery et al. |
| 5,485,641 A * | 1/1996 | Machmeier et al. ........... 7/134 |
| 5,528,833 A | 6/1996 | Sakuma |
| 5,862,597 A | 1/1999 | Juros |

FOREIGN PATENT DOCUMENTS

DE  3344-863 A  12/1984

* cited by examiner

*Primary Examiner*—Douglas D. Watts

(57) ABSTRACT

A cutting device is provided that includes a first handle having first and second ends, and a second handle having first and second ends. The second handle being coupled to the first handle. A first ceramic blade is coupled to the second end of the first handle, and a second ceramic blade is coupled to the second end of the second handle in cutting alignment with the first blade. The first and second handles are adapted to be operated to move the first and second blades into a contacting relationship to provide a cutting force, and the ceramic material of the first and second blades provide operator protection from electric shock, prevent device damage and minimize environmental hazard.

10 Claims, 2 Drawing Sheets

DEVICE FOR SEVERING ELECTRICAL CONDUCTORS

BACKGROUND OF THE INVENTION

This invention relates to a hand operated device for severing heavy duty electrical conductor(s) carrying potentially lethal voltage/current with safety to the operator, the device and the environment. Use of this invention in cutting such electrical conductor(s) protects the operator from electric shock, protects the cutting device from melt/weld damage and minimizes the potential for spark or flame production and hence for ignition of explosive or flammable ambient environmental hazards such as natural gas, propane, methane and gasoline fumes. Further, use of this invention in cutting high voltage/current conductors minimizes the risk of ignition of low flammability materials associated with an ambient high oxygen environment.

Previous art designed for severing heavy duty high voltage/current conductors have used iron or steel alloy cutter blades or surfaces. Typically, other structural elements of such devices of previous art, most specifically handles and fulcra mechanisms, are stamped or forged from iron or steel alloy as well. Thus, all essential structural components of such tools may be electrically conductive. Attempts to minimize electric shock hazard to the operator using such metalic tools have taken two forms. The first has been to electrically insulate the handles of such cutting devices with coatings or sleeves of high resistance materials such as rubber or plastic. Second, and rarely, the handles of such devices have been fabricated from a structurally rigid and electrically resistive material such as fiberglass. Fiberglass, if well maintained and free of conductive contaminants such as grease and oil, provides excellent operator protection from electric shock. Cutting device handles insulated with rubber or plastic coatings or sleeves are very difficult to maintain and represent a potential hazard to the operator. Damage to the insulating materials due to workplace abuse such as cuts and abrasions may sometimes be visually detected before operator injury occurs. However, such insulative materials are subject to degradation through contact with chemical solvents in the workplace and to cracking and micropores due to ultraviolet and ozone exposure. Such degradation is usually not visually detectable and thus may constitute an unknown and potentially lethal hazard to the operator.

Aside from issues of operator safety regarding the quality of cutting tool handle insulation, the use of tools with metalic cutting blades or surfaces poses another, and potentially greater, hazard. In emergencies resulting from fires, floods, hurricanes/tornados and earthquakes high voltage/current power lines, service trunks and feeder legs must often be severed to terminate electrical power to damaged structures. Such cutting is required because of electrocution hazard and often appropriate breakers or switches cannot be located or accessed. Concurrently, such natural or man made disasters often rupture natural and propane gas service lines and may damage storage tanks for gasoline and other flammable or explosive chemicals. Such damage may result in ambient concentrations or pockets of potentially explosive gases or vapors which are easily ignited by sparks or flame. If electrical power lines are severed in such flammable environments, metalic bladed/surfaced cutting devices may ignite them.

A single high voltage/current conductor may be safely severed with a conventional metalic cutting blade, of previous art, if (a) appropriate intact insulation protects the operator from electrical ground potential and (b) the metalic aspects of the cutting device do not themselves contact ground potential while in contact with the conductor to be cut. Provision (a) protects the operator from electric shock and provision (b) assures that no spark or flame will occur by ground potential contact through the cutting device. Most commercial service lines do not have common buss grounding and such lines are composed of multiple, individually insulated, conductor packages of both high and low electromotive force potential. These are commonly represented by the ROMEX style cable and typically carry 110 to 440 volts AC with current potentials of hundreds of amperes. The severing of any such multiple conductor package or cable with a metalic blade cutting device will result in spark and flame. While the operator may not sustain electric shock injury, the cutting device will be distroyed through melting and welding. If ambient explosive gases, fumes or vapors are present, a violent explosion may be anticipated. Many deaths occur annually due to spark ignited gas explosions following natural and man made disasters.

Accordingly, the need exists for a high voltage/current cutting device which provides safety to the operator from electric shock injury, protects the cutting device from damage and minimizes the potential for spark and flame production when severing single and multiple high voltage/current conductors.

SUMMARY OF THE INVENTION

According to the present invention, the foregoing and other objects are attained by providing an electrical conductor cutting device including a first handle having first and second ends and a second handle moveably coupled to the first handle, having, as well, first and second ends. The cutting device further includes a first high electrical resistance ceramic cutting blade coupled to the second end of the first handle and a second high electrical resistance ceramic cutting blade coupled to the second end of the second handle in cutting alignment with the first blade. The first and second handles are adapted to be operated to move the first and second ceramic cutting blades into a contacting relationship to provide a cutting force.

Unlike metalic cutting blades of previous art, the cutting blades of this invention are constructed of a ceramic material possessing the properties of very high electrical resistance, tensile and shear strength and thus, in operating practice, protects the operator from electric shock injury while protecting the cutting device from weld damage and minimizing the potential for spark or flame production while severing multiple or single high voltage/current conductors. Unlike previous art employing ceramic cutting surfaces, embodiments of this invention specify cutting blades and mechanisms of sufficient torque, shear and tensile properties to effectively sever electrical conductors up to size 4/0 AWG carrying potentially lethal voltages/currents.

Additional objects, advantages and novel features of this invention will be set forth in part by the descriptions which follow and, in part, will become apparent to those skilled in the art upon examination of the following, or may be learned from practice of this invention.

The invention, having now been briefly summarized, may be further appreciated by an illustrative embodiment through the following explanations and drawings.

BRIEF DESCRIPTION OF THE DRAWINGS

In the accompanying drawings, which form part of the specifications and are to be read in conjunction therewith, and in which like reference numerals are used to indicate like parts in the various views.

DETAILED DESCRIPTION OF THE INVENTION

Figure 1:
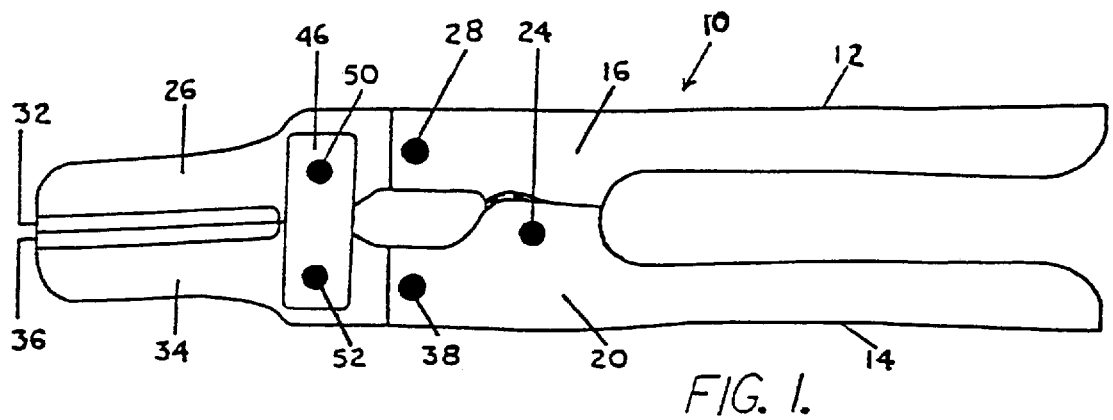
FIG. 1 is a side elevation view of the cutting device of the present invention in a first position (closed) with fasteners.
Figure 2:
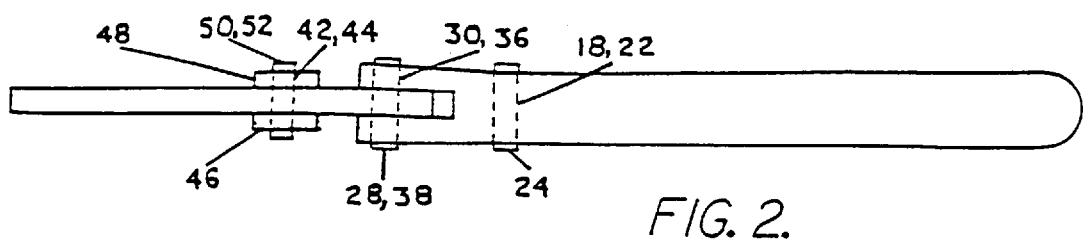
FIG. 2 is a top elevation view of the cutting device of the present invention in a second position with fasteners.
Figure 3:
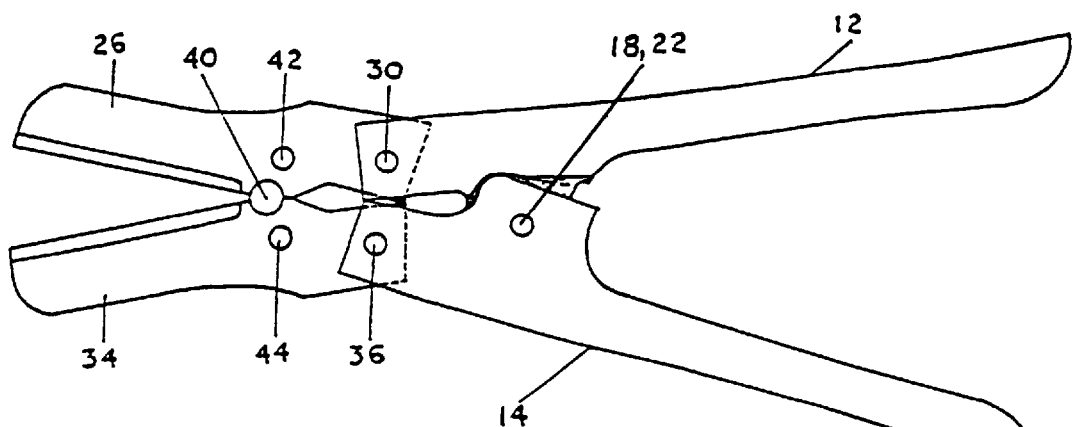
FIG. 3 is a side elevation view with the device handles in the open position with fasteners absent. The pivot plates are removed to reveal the pivot disc. The cutting blades are shown extending into the handles to the area of the dashed lines. Shaded areas indicate milled segments of the handle bodies which permit their fitting and articulation.
Figure 5:
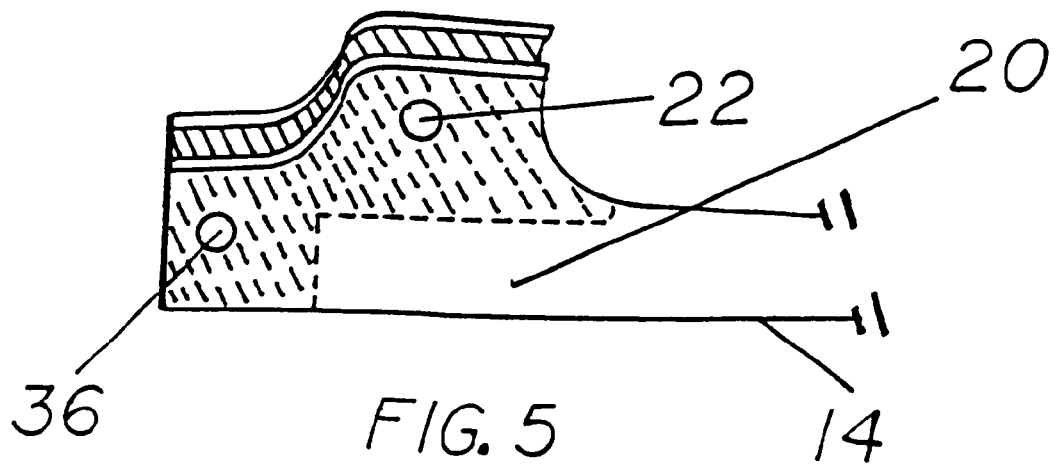
FIG. 5 is a side elevation view of the handle bodies (open) with fasteners absent. Milled protrusions and recesses in this view are indicated by solid oblique hatch lines. Subsurface milling is indicated by dashed oblique hatch lines. The cutter handle bodies are shown withdrawn from their articulated and nesting position.

Referring to the drawings in greater detail, FIG. 1 and FIG. 3 depict the cutting device designated by the numeral 10. Cutting device 10 has a first handle 12 that is movably connected to a second handle 14. More specifically, handle 12 has a body portion 16 with a hole 18 extending therethrough. Similarly, handle 14 has a body portion 20 that has a hole 22 extending therethrough in alignment with hole 18. Body portion 16 is milled to be received within the milled cavity of body portion 20 in a nesting and articulating relationship. This relationship is clearly shown in FIG. 5. A fastener 24 is operably placed through holes 18 and 22 in body portions 16 and 20 to pivotally connect handles 12 and 14. Those skilled in the art would know of several other ways to pivotally connect the first and second handles to achieve the results if the present invention.

The first and second handles 12, 14 are preferably formed from a metal material. However, first and second handles 12,14 can also be formed of any type of rigid synthetic material which can withstand the torque and stress applied to the handles during operation of the cutting device.

Attached to the terminal end of handle 12 is a first blade 26. Blade 26 is movably connected to handle 12 with a fastener 28. Blade 26 includes a mounting hole 30 through which fastener 28 is placed. Further, as best seen in FIG. 1, blade 26 includes a beveled cutting surface 32. Similarly attached to the terminal end of handle 14 is a second blade 34. Blade 34 contains a mounting hole 36 through which fastener 38 is placed to movably mount blade 34 on handle 14. Blade 34 includes a beveled cutting surface 36. As seen in FIG. 1, the beveled cutting faces of blades 26,34 abut when the blades are in a closed position thus to allow severing of electrical conductors.

Figure 4:
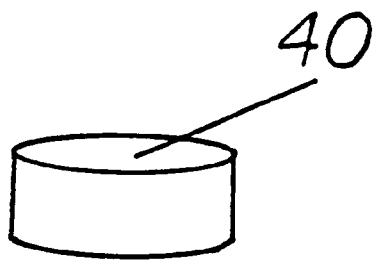
FIG. 4 is a side elevation view of the pivot disc.

Device 10 includes a mechanism which maintains blades 26 and 34 in cutting alignment, retains pivot disc 40 (FIG. 3, FIG. 4) and provides device safety by blocking cutting materials from contacting metalic handle bodies 16,20. Blade 26 contains hole 42 and blade 34 contains hole 44. Holes 42,44 are used to mount a first pivot plate on one side of blades 26 and 34 and a second pivot plate on the opposite side of blades 26 and 34. Pivot plates 46 and 48 are attached to one another through blades 26 and 34 with fasteners 50 and 52. Pivot plates 46 and 48 serve to maintain blade cutting alignment, retain pivot disc 40 and provide device safety.

Blades 26 and 34 are fabricated from a high electrical resistance ceramic material. In the depicted embodiment, blades 26 and 34 are fabricated from a ceramic material with electrical, physical and mechanical properties sufficient to allow the blades to sever heavy duty electrical conductors of copper and aluminum alloys. The following properties would characterize ceramic materials for the fabrication of blades 16 and 34: a density of about 3.8 grams per centimeter cubed, a porosity of about 0 percent, a water absorption/saturation of about 0 percent, a dielectric constant of about 9.0, a dielectric strength of about 9.5 kilovolts per millimeter, volume resistivity of about 10 to the $13^{th}$ power omega per centimeter, a compressive strength of about 2100 MPa, a shear strength of about 320 MPa, a Vickers hardness of about 1500 kgf per mm squared, and a tensile modulus of about 330 GPa. While ceramic materials with the above physical, mechanical and electrical properties are ideal, ceramics with properties similar to those cited above may be suitable for the present invention. The preferred ceramic material of the present invention is zirconia.

In operation, a user will open handles 12 and 14 which causes blades 26 and 34 to pivot about disc 40 and separate such that a conductor(s) may be placed between said blades. The user will then apply sufficient force on handles 12 and 14 such that blades 26 and 34 pivot about disc 40 and travel toward each other. With sufficient force applied, cutting surfaces 32 and 36 will abut and will operate to sever said conductor(s).

From the forgoing, it will be seen that this invention is one well-adapted to attain all the ends and objects hereinabove set forth, together with other advantages which are obvious and which are inherent to the structure of the invention. It will be understood that certain features and subcombinations are of utility and may be employed without reference to other features and subcombinations. This is contemplated by and is within the scope of the claims of this invention. Since many possible embodiments may be made of the invention without departing from the scope thereof, it is to be understood that all matters herein set forth or shown in the accompanying drawings are to be interpreted as illustrative and not in a limiting sense.

What is claimed is:

1. A hand operated cutting device having first and second ends; a first handle having first and second ends, a second handle having first and second ends, said second handle being movably coupled to said first handle; a first ceramic cutting blade coupled to the first handle; and a second ceramic cutting blade coupled to the second end of the second handle and in cutting alignment with the first ceramic blade, wherein the first and second handles are adapted to be operated to move the first and second ceramic blades into coacting relationship so as to provide a cutting force, and wherein the ceramic material of the first and second blades provide protection from electric shock, device damage from grounding and spark and/or flame production through grounding; and further including a first and second pivot plate each having a first and second end, wherein the first and second ends of the first and second pivot plates are coupled to the first ceramic cutting blade and the second ends of the first and second pivot plates are coupled to the second ceramic cutting blade, said first and second pivot plates operating to maintain alignment of said and second cutting blades while maintaining the position of a pivot disc operating between the first and second cutting blades and beneath said pivot plates, wherein said pivot disc constitutes the fulcrum and force transfer point between operator handle closure pressure and blade shear cutting force, and further that said pivot plates provide for operator and environmental safety from electric shock and grounding.

2. The cutting device of claim 1, wherein, articulating between the first and second cutting blades and beneath the aforementioned pivot plates, the pivot disc constitutes the fulcrum and force transfer point between operator induced closure pressure applied to the cutting device handles and shear force transmitted to the first and second cutting blades of the cutting device, and further, that the material from which said pivot disc is fabricated must be of sufficient tensile strength to withstand the applied forces.

3. The cutting device of claim 1, wherein the first and second pivot plates are fabricated from a high electrical resistance ceramic material.

4. The cutting device of claim 1, wherein the fist and second cutting blades are fabricated from a ceramic material with high tensile and shear strength and high electrical resistance.

5. The cutting device of claim 1, wherein the ceramic material of the first and second cutting blades is zirconia.

6. The cutting device of claim 1, wherein the first and second pivot plates are fabricated from a ceramic material with high tensile and shear strength and high electrical resistance.

7. The cutting device of claim 1, wherein the ceramic material of the first and second pivot plates are fabricated from zirconia.

8. The cutting device of claim 1, wherein the first and second pivot plates am coupled to the first and second cutting blades.

9. The cutting device of claim 1, wherein the handles of the cutting device are fabricated of a high electrical resistance ceramic material.

10. The cutting device of claim 1, wherein the first and second pivot plates are fabricated from a fiberglass material.

\* \* \* \* \*